United States Patent [19]

Bjorklund

[11] 4,297,035

[45] Oct. 27, 1981

[54] METHOD AND DEVICE FOR DETECTING A SPECIFIC SPECTRAL FEATURE

[75] Inventor: Gary C. Bjorklund, Los Altos, Calif.

[73] Assignee: International Business Machines Corporation, Armonk, N.Y.

[21] Appl. No.: 75,436

[22] Filed: Sep. 14, 1979

[51] Int. Cl.³ ............................................ G01N 21/27
[52] U.S. Cl. ................................... 356/402; 356/300; 356/432
[58] Field of Search ........................ 356/300, 402, 432

[56] References Cited

U.S. PATENT DOCUMENTS

| | | |
|---|---|---|
| 3,810,108 | 5/1974 | Krewson et al. |
| 3,899,430 | 8/1975 | Ancker-Johnson ............ 329/144 X |
| 3,975,628 | 8/1976 | Graves et al. ................. 325/421 X |
| 4,142,773 | 3/1979 | Avramenko et al. ............. 350/3.78 |
| 4,146,783 | 3/1979 | Desbois et al. ............. 350/162 R X |

OTHER PUBLICATIONS

Harris et al., *Applied Physics Letter*, vol. 7, No. 7, Oct. 1, 1965, pp. 185–187.
Tang et al., *Journal of Applied Physics*, vol. 45, No. 10, Oct. 1974, pp. 4503–4505.

*Primary Examiner*—F. L. Evans
*Attorney, Agent, or Firm*—Joseph E. Kieninger

[57] ABSTRACT

A method and device for detecting a narrow spectral feature in a sample is described. The method includes the steps of providing a beam of light having an optical frequency bandwidth which is narrow compared to the width of the narrow spectral feature and having a center frequency $\omega_C$ which lies near the narrow spectral feature, phase modulating the beam of light with a single RF frequency to provide a pure FM spectrum having upper and lower sidebands, exposing the sample containing the narrow spectral feature to the modulated light so that only one of the FM sidebands probes the narrow spectral feature, photodetecting the light emerging from the sample to detect a RF beat at the specific RF frequency used for phase modulation, and electronically monitoring the amplitude of the RF beat signal to indicate the strength of the narrow spectral feature. A preferred embodiment of this invention is a multiplex readout device for hole burning memories. The device includes means for using a frequency modulated laser light with widely spaced sidebands arranged so that only one of each pair of upper and lower sidebands probes the frequency location of each hole. The device uses many simultaneous RF frequencies to drive the phase modulator and produce the light with FM sidebands which simultaneously probes all the hole locations of interest. The device includes photodetection means to receive the light after it has passed through the sample and phase sensitive multiplex analyzing means to process the electrical signals from the photodetection means to indicate the presence or absence of holes.

10 Claims, 4 Drawing Figures

METHOD AND DEVICE FOR DETECTING A SPECIFIC SPECTRAL FEATURE

DESCRIPTION

Technical Field

This invention relates to spectroscopy and more particularly to a method and apparatus for detecting one or more spectral features in a sample.

It is a primary object of this invention to provide an improved method and apparatus for detecting a single narrow spectral feature.

It is another object of this invention to provide an improved method and apparatus for detecting a plurality of narrow spectral features.

It is still another object of this invention to provide an improved method and apparatus for detecting a plurality of narrow spectral features simultaneously.

It is yet still another object of this invention to provide an improved method and apparatus highly sensitive to the presence of a narrow spectral feature.

It is a further object of this invention to provide an improved method and apparatus for the rapid multiplex readout of a plurality of narrow spectral features without requiring any tuning of a laser.

Background Art

Several different approaches have been reported in the literature for detecting a restricted type of spectral feature, that is, a single absorption line in a sample. One of these methods utilizes the appearance of RF beat frequencies when the FM sideband structure of frequency modulated laser light is distorted to lock the center frequency of a FM laser to gain line center. This is described by S. E. Harris et al in the Applied Physics Letter, Vol. 7, page 185, 1965. In the Harris et al approach, all of the FM sidebands are contained within the feature of interest, i.e. the gain line profile. Harris et al propose to utilize the RF beat frequency including both FM sidebands only to locate the center of a very strong line. This method is not suitable for weak absorption lines or for dispersions, that is, optical phase shifts, that are separately measured. This method does not teach or suggest a multiplex readout feature.

Another approach is described by M. Cardona in Modulation Spectroscopy, Academic Press, New York, 1979. This approach involves sinusoidally frequency-swept incoherent light utilized for some period of time to probe weak absorptions in solid state samples. In this approach, an RF signal is obtained which is proportional to the derivative of the absorption profile. This technique uses incoherent light and, hence, there is no heterodyne amplification of the signal. This method also required a monochromator to provide spectral resolutions and, as a result, spectral resolution finer than 30 GHz is not achieved. This approach is not suitable for multiplex readout since incoherent light is used.

Another approach is described by C. L. Tang et al in the Journal of Applied Physics, Vol. 45, page 4503, 1974.

The Tange et al approach involves a sinusoidally frequency-swept dye laser which is utilized to probe weak absorption in solid state samples. In this case, since a laser is used, spectral resolution of 10 MHz can be obtained. This technique uses a dye laser spectrum which is not a pure FM spectrum and, as a result, there is no heterodyne amplification of the signal. This technique cannot directly measure the absorption or dispersion since it only measures the derivative of the absorption. With this approach a multiplex readout is impossible.

BRIEF DESCRIPTION OF THE DRAWINGS

In the accompanying drawings forming a material part of this disclosure.

DISCLOSURE OF THE INVENTION

For further understanding of the invention and of the objects and advantages thereof, reference will be had to the following description and accompanying drawings, and to the appended claims in which the various novel features of the invention are more particularly set forth.

A method and device for detecting a narrow spectral feature in a sample is described. In this invention, a narrow spectral feature is defined as any optical property of the sample, such as absorption, transmission, reflectivity, index of refraction and optical length which varies rapidly with the optical frequency. Specific narrow spectral features which will be described in detail hereafter are (a) a narrow absorption line and (b) holes burned in a broad spectral feature such as an inhomogeneous absorption band. The method includes the steps of providing a beam of light having an optical frequency bandwidth which is narrow compared to the width of the absorption line and having a center frequency $\omega_C$ which lies near to the line, phase modulating the beam of light with a single RF frequency to provide a pure FM spectrum having upper and lower sidebands, exposing the sample containing the absorption line to the modulated light so that only one of the FM sidebands probes the absorption line, photodetecting the light emerging from the sample to detect a RF beat at the specific RF frequency used for phase modulation, and electronically monitoring the amplitude of the RF beat signal to indicate the strength of the absorption line. A preferred embodiment of this invention is a multiplex readout device for hole burning memories. The device includes means for using a frequency modulated laser light with widely spaced sidebands arranged so that only one of each pair of upper and lower sidebands probes the frequency location of each hole. The device uses many simultaneous RF frequencies to drive the phase modulator and produce the light with FM sidebands which simultaneously probe all the hole locations of interest. The device includes photodetection means to receive the light after it has passed through the sample and phase sensitive multiplex analyzing means to process the electrical signals from the photodetection means to indicate the presence or absence of holes.

Best Mode for Carrying Out The Invention

Figure 1:
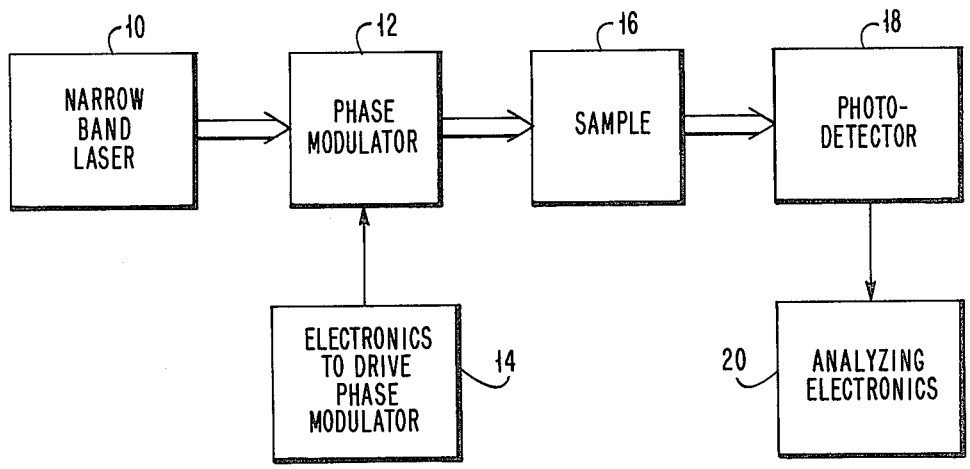
FIG. 1 is a schematic diagram of the device.

An embodiment will now be described in terms of the device and method for the multiplex readout of information encoded by the presence or absence of photochemical holes burned in an inhomogeneous absorption band. As shown in FIG. 1, the first step is to provide a narrow band laser 10 having an optical frequency $\omega_C$.

Figure 2:
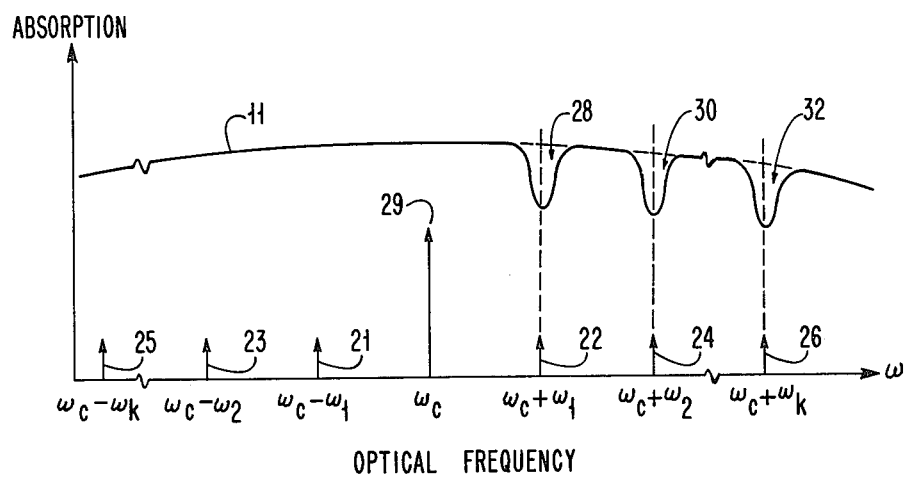
FIG. 2 is a diagram showing the relative positions of hole locations and FM sidebands in one embodiment.

Examples of a narrow band laser are a single frequency dye laser and a fixed single mode frequency solid state laser. The carrier frequency 29, $\omega_C$, is chosen to lie at the center of the inhomogeneous absorption band 11 as shown in FIG. 2. The inhomogeneous absorption band with holes is one example of a spectral feature whose absorption and index of refraction vary with optical frequency. The laser has a bandwidth which is narrow compared to the desired resolution of the information in the spectral feature, that is, the width of the photochemical holes. The laser passes light into the phase modulator 12 which modulates the light from the laser source to provide a plurality of widely spaced pairs of FM sidebands that are arranged so that only one of each pair probes the optical frequency of each hole. An example of a modulator 12 is an electro-optic phase modulator which is commercially available. Electronic means 14 drives the phase modulator 12 simultaneously with a plurality of different RF frequencies to produce light with FM sidebands which simultaneously probe all hole locations of interest in the sample 16 as shown in FIG. 2. An example of electronic means 14 is a frequency comb generator. The modulated laser beam passes through the sample 16 containing the absorption band with holes therein and impinges on a fast photodetector 18.

A bit of information in the sample 16 is encoded by the presence or absence of a hole at a location which corresponds to a particular FM upper sideband. For example, the FM upper sidebands 22, 24 and 26 correspond to the holes 28, 30 and 32 respectively. The presence of a hole will cause a differential absorption or phase shift to be experienced between the upper FM sidebands 22, 24 and 26, and the lower FM sidebands 21, 23 and 25 respectively which correspond to the hole location. Such a differential will produce a heterodyne amplified beat signal at the corresonding RF frequency at the photodetector 18, while if there is no differential, no beat signal will be produced.

The photodetector 18 electrical signal, which simultaneously contains the different RF frequencies which correspond to the holes which are present, is processed by phase sensitive multiplex analyzing electronics 20. An example of a photodetector 18 is a solid state PIN diode. The design of electronics 20 is straightforward and well within the state of the art. An example of the electronics 20 is a parallel array of double balanced mixers, each of which is driven by a local oscillator at one of the RF frequencies used to modulate the laser. The analyzing electronics 20 discriminates among the different hole locations on the basis of the different RF frequencies, and isolates the signals due to differential absorption from those due to differential phase shift by comparing the phase of each RF beat signal to the phase of the corresponding RF driving frequency of the modulator. If there are a large number of hole locations, it is advantageous to use only that portion of the beat signal which is due to the differential absorption, since the combined phase differentials caused by the presence of the holes at other frequency locations can cause a spurious differential signal. The length of time necessary for the multiplex readout is of the order of $\Delta\omega^{-1}$, where $\Delta\omega$ is the typical frequency spacing between hole locations.

By using this method and/or device, all of the hole locations can be simultaneously probed and multiplex readout achieved without tuning the laser frequency or any of the RF frequencies. With this method, the entire multiplex readout of 100 holes can be accomplished in 10 nsec, corresponding to a data rate of $10^{10}$ bits per second.

Another advantage with this method is the heterodyne amplification effect which produces the RF beat signals with amplitudes proportional to the geometric mean of the intensity of the carrier at $\omega_C$ and the FM sideband. This allows the hole locations to be probed with relatively weak optical power densities, thus eliminating undesirable further hole burning during readout.

This method also provides an additional advantage in that the beat signals appear at RF frequencies where the noise power of any well designed single axial mode laser will be very low and approach the quantum limit. This means that if N photons in a particular sideband are used to probe a particular location on the absorption profile, a differential absorption as small as one part in the square root of N can be detected. Thus, if a conservative number such as $10^{14}$ photons are assumed to be in the sideband, a differential absorption as small as one part in $10^7$ can be detected. This represents roughly a factor of $10^4$ advantage over conventional direct absorption spectroscopy done with slowly tuned lasers, which is limited by 1/f noise to sensitivities which are $10^5$ worse than the quantum limit.

Figure 3:
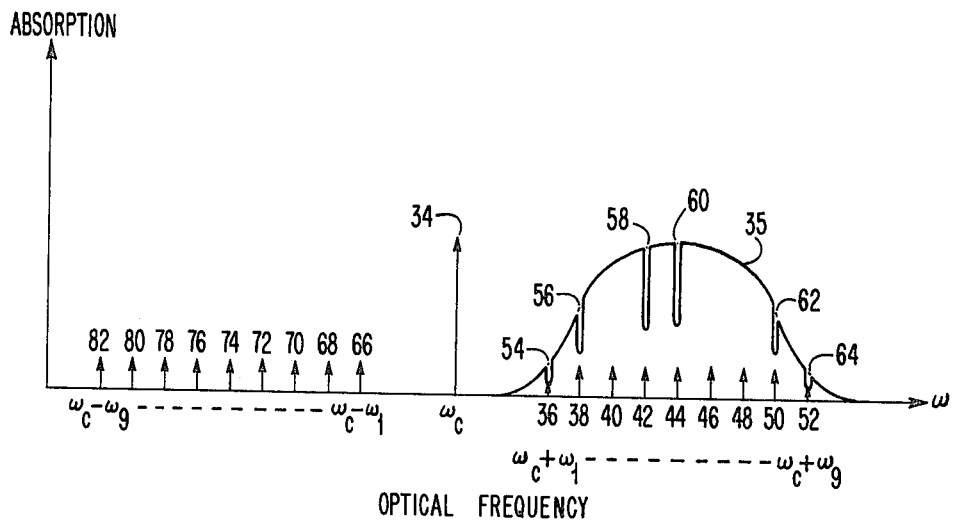
FIG. 3 is a diagram showing the relative positions of hole locations and FM sidebands in a second embodiment.

An alternative embodiment as shown in FIG. 3 utilizes the same elements as described above. The only differences are that the carrier frequency 34, $\omega_C$, is chosen to lie near to, but not on, the inhomogeneous absorption band 35 and that the RF frequencies are chosen so that FM upper sidebands 36, 38, 40, 42, 44, 46, 48, 50 and 52 overlap the entire inhomogeneous absorption band 35. FIG. 3 shows the relative positions of the holes 54, 56, 58, 60, 62 and 64 and the FM sidebands. A bit of information is encoded by the presence or absence of a hole at a location which corresponds to a particular FM upper sideband. If no hole is present the maximum differential absorption or phase shift will be experienced between the upper FM sidebands 36, 38, 40, 42, 44, 46, 48, 50 and 52 and the lower FM sidebands 66, 68, 70, 72, 74, 76, 78, 80 and 82 which correspond to the hole location and thus the maximum beat signal at the corresponding RF frequency will be produced. The presence of a hole will produce a smaller differential and hence a smaller RF signal.

Industrial Applicability

Figure 4:
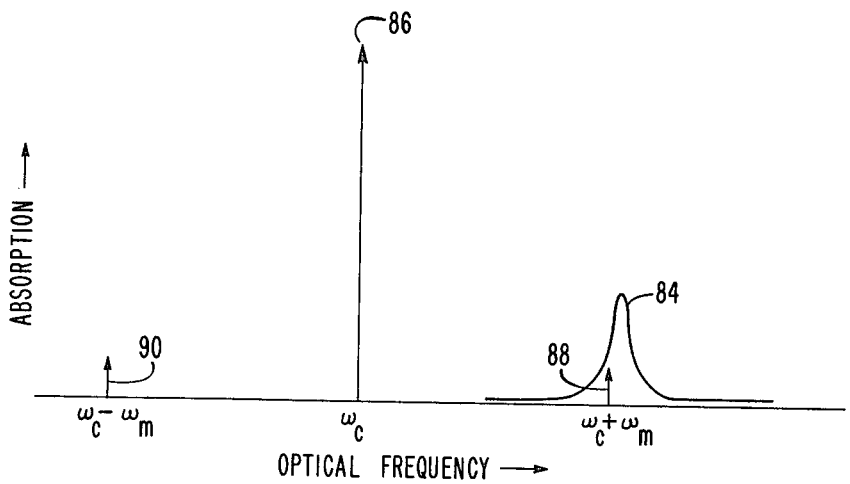
FIG. 4 is a diagram showing the relative positions of the absorption line and FM sidebands.

This invention is much broader than the embodiment dealing with multiplex readout for optical memories based upon photochemical hole burning. This invention provides a basis for spectroscopic diagnostic instruments, for example, for gas phase chemical reaction or molecular beam epitaxy. For example, this invention describes a method of detecting a specific narrow absorption line which is characteristic of a particular component in a sample. The first step in this method is providing a narrow beam of light having an optical frequency bandwidth which is narrower than the width of the absorption line 84 and which has a center frequency 86 $\omega_C$, which lies near the line 84 as shown in FIG. 4. The next step is to phase modulate the beam of light with a single RF frequency to provide a pure FM spectrum having upper 88 and lower 90 sidebands. An example of the electronic means used to drive the phase modulator is a sweep oscillator. In an alternative embodiment the sweep oscillator enables the RF frequency to be swept, that is, varied continuously, to provide a spectrum of the spectral feature. The sample is exposed to the modulated light so that only one of the FM sidebands, 88 in FIG. 4, probes the absorption line. The light emerging from the sample is then photodetected to detect an RF beat at the specific RF frequency used for phase modulation. The amplitude of the RF beat signal is electrically monitored as its frequency is varied to indicate the strength of the absorption line.

While I have illustrated and described the preferred embodiments of my invention, it is understood that I do not limit myself to precise steps herein and the right is secured to allow changes and modifications coming within the scope of the invention as defined in the appended claims.

I claim:

1. A method of detecting a single narrow spectral feature in a sample comprising
    providing a beam of light having an optical frequency bandwidth which is narrow compared to the width of the narrow spectral feature and having a center frequency $\omega_C$ which lies near the feature;
    phase modulating the beam of light with a single RF frequency to provide a pure FM spectrum having upper and lower sidebands;
    exposing the sample containing the narrow spectral feature to the modulated light so that only one of the FM sidebands probes the narrow spectral feature;
    photodetecting the light emerging from the sample to detect a beat at the specific RF frequency used for phase modulation; and
    electronically monitoring the amplitude of the RF beat signal to indicate the strength of the narrow spectral feature.

2. A method as described in claim 1 including monitoring the phase of the RF beat signal.

3. A method as described in claim 1 whereby the phase modulating RF frequency is swept to provide a spectrum of the narrow spectral feature.

4. A method of detecting and recovering additional information contained in a broad spectral feature in a sample whose absorption and index of refraction vary with time and optical frequency comprising
    providing a beam of light having an optical frequency bandwidth which is narrow compared to the desired resolution of the information in the broad spectral feature;
    phase modulating the beam with a plurality of RF frequencies to provide a plurality of FM spectra having upper and lower sidebands which are widely spaced compared to the bandwidth of the original beam of light;
    exposing the sample containing the broad spectral feature to the modulated light so that one of each pair of FM sidebands probes the broad spectral feature at a different optical frequency location,
    photodetecting the light emerging from the sample to simultaneously detect beats at the specific RF frequencies used for phase modulation; and
    electronically monitoring the amplitude of each RF beat signal as a function of time.

5. A method as described in claim 4 including monitoring the phase of each RF beat signal.

6. A method as described in claim 4 whereby the RF frequencies are chosen so that each narrow spectral feature contained in the broad spectral feature is probed by one of each pair of FM sidebands.

7. A method as described in claim 4 whereby the optical bandwidth of the beam of light is centered at a frequency position within the broad spectral feature.

8. A method as described in claim 4 whereby the optical bandwidth of the beam of light is centered at a frequency position outside the broad spectral feature.

9. A device for detecting a narrow spectral feature in a sample comprising:
    a laser source having a bandwidth narrower than the width of the narrow spectral feature and having a center frequency $\omega_C$ which lies near a selected narrow spectral feature,
    phase modulator means for modulating the light from said laser source to a pure FM spectrum having upper and lower sidebands,
    means for driving said modulator means with a single RF frequency to produce an FM sideband which probes the selected narrow spectral feature in the sample,
    photodetection means to receive the light after it has passed through the sample, and
    electronic detection means which is capable of monitoring the intensity of the RF electrical signals from said photodetection means to indicate the strength of the selected narrow spectral feature.

10. A device as described in claim 9 wherein the laser source means is a single frequency laser.

* * * * *